April 15, 1958     A. D. ROBBINS     2,830,671
DESICCATOR
Filed Sept. 28, 1955     3 Sheets-Sheet 3
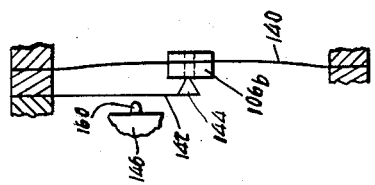
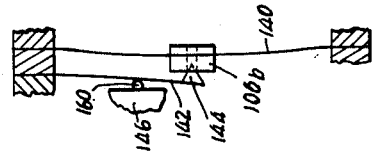
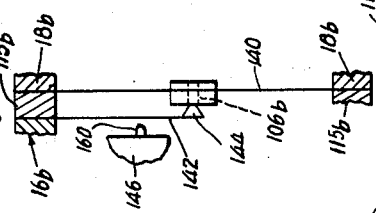
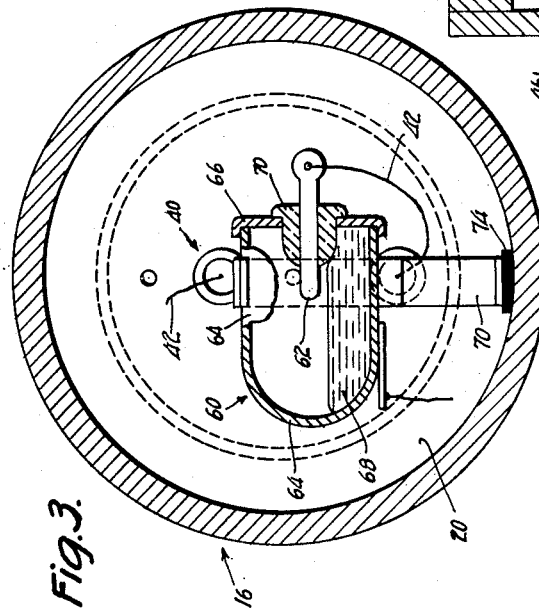
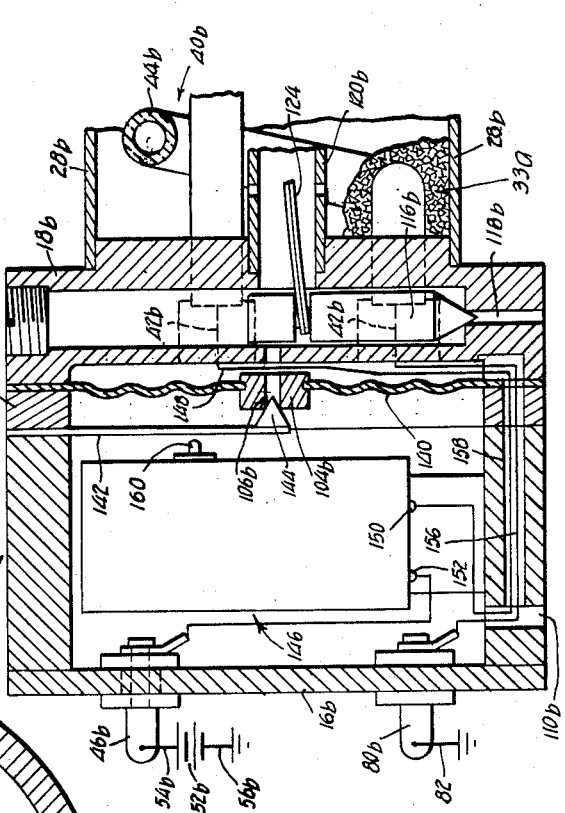
INVENTOR.
Azor D. Robbins
BY
Moses, Nolte, Crews & Berry
ATTORNEYS

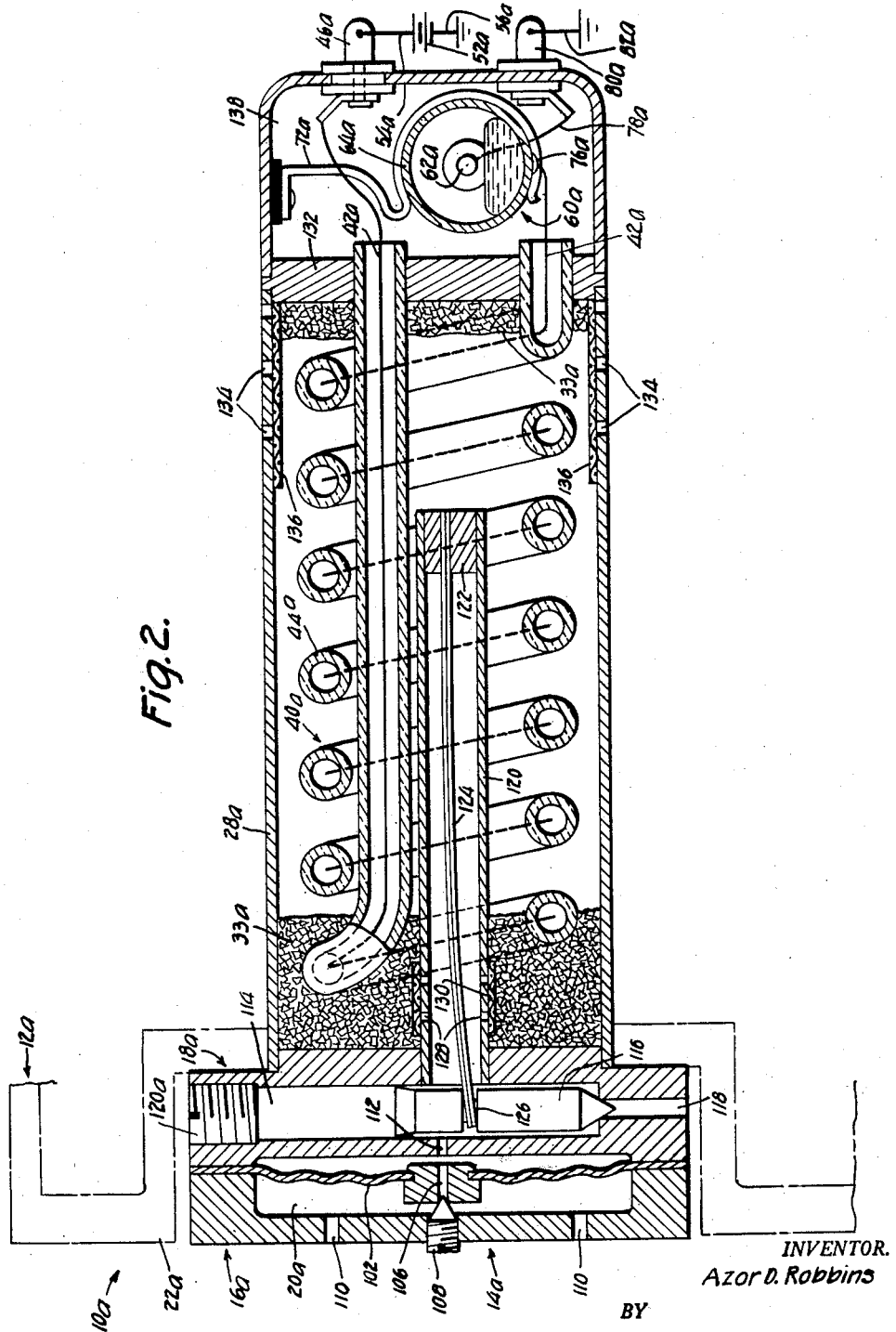

United States Patent Office 2,830,671
Patented Apr. 15, 1958

2,830,671

DESICCATOR

Azor D. Robbins, Hempstead, N. Y., assignor to The W. L. Maxson Corporation, New York, N. Y., a corporation of New York Application September 28, 1955, Serial No. 537,149

8 Claims. (Cl. 183—4.1)

This invention relates to mechanism for controlling the humidity within the casing of an airborne instrument. Many of the airborne instruments used today are subject to fogging with changes of pressure and temperature. Such fogging impairs the immediate usefulness of the instrument and may cause permanent damage. Complete sealing is not a satisfactory answer to the problem of preventing fogging nor to the problem of preventing the permanent damage which high humidity and condensation may produce. Complete sealing cannot be depended upon because leaks, slow or fast, do develop in many instances. The better practice is to permit the instrument to breathe, but to keep the air within the instrument dry.

It has been proposed in a breathing instrument to provide a quantity of absorbent desiccant material between the external atmosphere and a closed instrument casing, through which air must pass in entering or leaving the casing, together with pressure responsive means for causing the dessicant material to be heated for driving off moisture and thereby reactivating the material when an excess of internal pressure causes air to be discharged to the atmosphere through the desiccant, and to discontinue the heating when the pressure in the housing falls to or below atmospheric pressure so that air entering the casing will be caused to pass through the unheated desiccant material and to be deprived of moisture as it flows toward the interior of the casing.

The present invention is designed to effectuate the same object indicated above, but through simpler and more efficient mechanism.

In the simplest form of the invention, the casing is placed in constant communication with the atmosphere through a body of desiccant material, and electrical means, responsive to the flying attitude of the aircraft, causes the desiccant to be heated whenever the aircraft is nosed up beyond a definite angle and to be unheated at all other times. Since the external pressure falls as the aircraft climbs, air flows from the casing to the atmosphere at that time and sweeps out with it moisture driven out of the desiccant material by the heater. As the aircraft descends air flows in the opposite direction through the desiccant, which, through its reactivation is in condition thoroughly to dry the air.

This simple structure can be used satisfactorily if the aircraft is in daily use, or if provision is made to seal off the admission and discharge orifices while the aircraft is on the ground. It has the disadvantage that in the absence of some protective measure the desiccant may become saturated with moisture while the aircraft sits on the ground, through breathing induced by barometric variations at ground level.

In a further embodiment of the invention intake and outlet valves are provided, in conjunction with the same scheme for making the heater responsive to the attitude of the aircraft. Both valves are normally closed and are held closed with sufficient force to prevent their responding to usual barometric variations at ground level.

It is a feature, however, that provision is made for opening the discharge valve in response to heat furnished by the heater. The intake valve is desirably independently controlled by a pressure responsive diaphragm to open when the external pressure exceeds the internal pressure by a predetermined amount.

In a further form of the invention the heater switch is rendered active and inactive through the action of a diaphragm which carries the ported element of the intake valve. The cooperative port closing member is carried by a spring arm which is displaced outward as the diaphragm bulges in response to an excess of pressure within the casing and which serves as the actuator for the heater switch when so displaced. When the internal and external pressures are equalized, the diaphragm and the switch actuating arm return to normal positions in which the heater is switched off and the intake valve is held closed. Upon further increase of external pressure relative to the internal pressure, however, the diaphragm is displaced inward beyond its normal position but the port closing member does not follow the diaphragm, so that the intake port is open for the admission of air.

Other objects and advantages will hereinafter appear.

In the drawing forming part of this specification:

Fig. 2 is a similar view illustrating a second form of humidity control mechanism according to the invention;

Fig. 3 is a sectional view taken on the line 3—3 of Fig. 1, looking in the direction of the arrows;

Fig. 4 is a fragmentary sectional view showing a portion of a third form of humidity control mechanism according to the invention; and Figs. 5 to 7 are diagrammatic views illustrating the switch and intake valve control means of Fig. 4 respectively, in the normal condition, the switch closing condition, and the air admitting condition.

Figure 1:
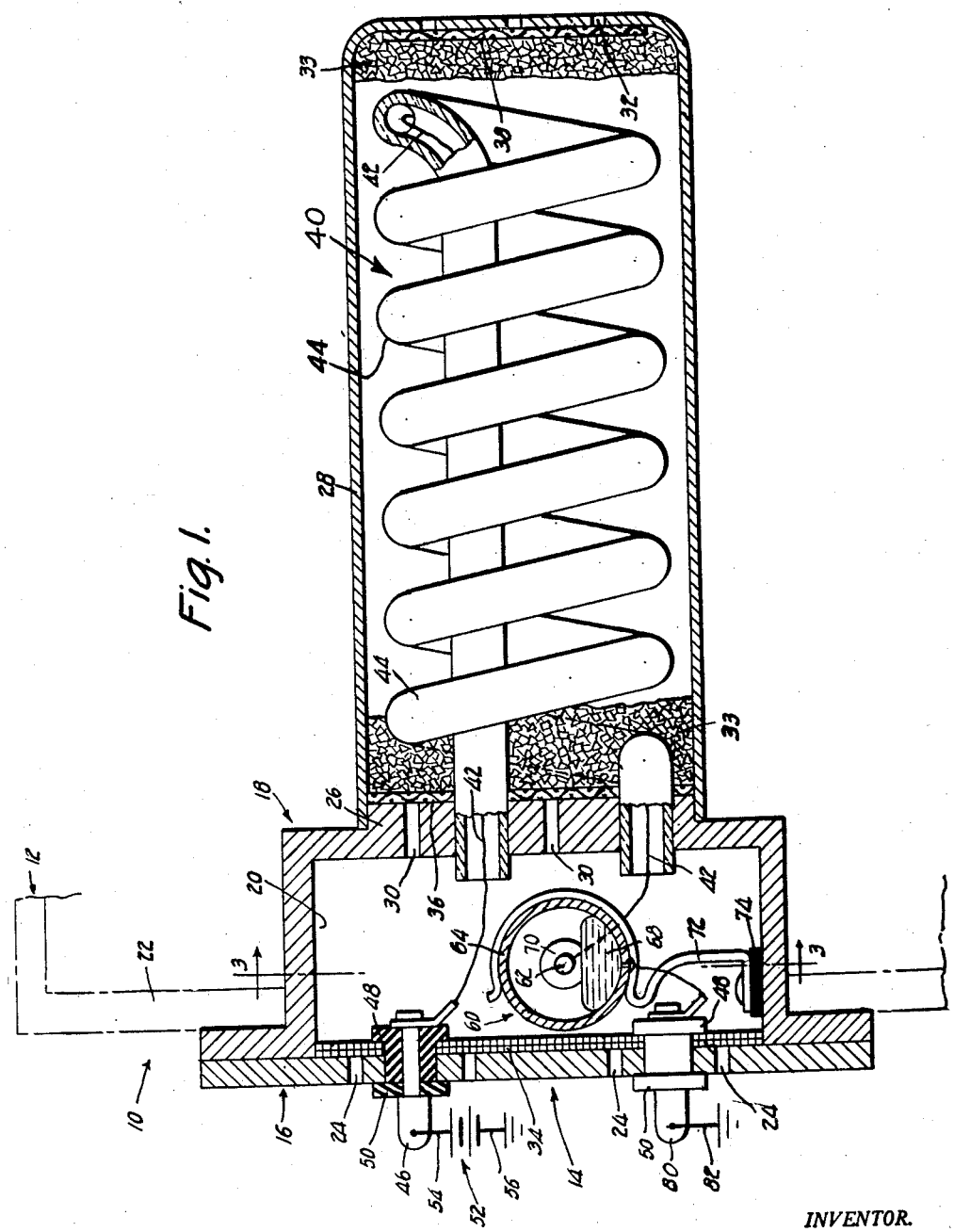
Fig. 1 is a fragmentary sectional view illustrating a portion of an instrument casing together with one form of humidity control mechanism according to the invention.

In Fig. 1 disclosure is made of an airborne instrument 10 having a casing 12. Humidity control mechanism 14 is mounted in a sealed manner in one wall of the casing 12 so that it is disposed chiefly within the casing 12. The humidity control mechanism 14 comprises complementary flat and cup shaped housing members 16 and 18 which jointly define a chamber 20. Marginal portions of the members 16 and 18 are juxtaposed and bear externally against the walls 22 of the casing 12, being arranged in sealing relation to the casing. The housing members 16 and 18 are secured to one another and to the wall 22 by any suitable means (not shown).

The housing member 16 is formed with air passages 24 for placing the chamber 20 in communication with the atmosphere. The housing member 18 has its rear wall formed with a circular boss 26 upon which a hollow cylindrical sleeve 28, closed at one end, is secured. Passages 30 are provided through the embossed area of the inner wall of the housing member 18 for placing the chamber 20 in communication with the outer ends of the sleeve 28. The inner end of the sleeve 28 is provided with perforations 32 for placing the sleeve 28 in communication with the interior of the casing 12. The cylinder 28 houses a column of suitable desiccant material 33, such as silica gel, so that all air which enters the casing 12 from the atmosphere or which returns to the atmosphere from the casing must traverse the full length of the desiccant column. Filters 34, 36 and 38 of gauze or paper are provided, respectively, adjacent the inner face of the housing member 16, and at opposite ends of the sleeve 28, the former to exclude dust and the two latter to assist in confining the desiccant while permitting the passage of air.

It is important that nothing but dry air enter the casing 12, and to this end it is essential that the desiccant be in an activated condition whenever air is passing through it toward the interior of the casing. Since the desiccant will soon become saturated with moisture unless reactivated, provision is made for reactivating the desiccant by driving off moisture when, and only when, air is flowing from the casing 12, through the desiccant column to the atmosphere. Thus, the moisture driven off is never carried toward the interior of the casing 12 but is always swept away by the escaping air and discharged to the atmosphere.

For the purpose of reactivating the desiccant, a heater 40 is provided inside the cylinder 28 and within the body of the desiccant. The heater consists of a length 42 of resistance wire, desirably of Nichrome, which is housed throughout most of its length within a spiral tube 44, desirably of glass. The ends of the tube 44 extend through the inner wall of the housing member 18 and communicate with the chamber 20.

One end of the resistance wire 42 is connected either directly, or through a more conductive length of wire, with a conductive post 46. The post 46 extends through the housing member 16, being mounted in suitably insulating members 48 and 50. The post 46 is connected to one terminal of a battery 52 (or other suitable source of electrical energy), through a conductor 54, the opposite terminal of the battery being grounded through a conductor 56. The opposite end of the resistance wire 42 is connected directly, or through a more conductive length of wire, with a terminal 58 of a mercury switch 60. The mercury switch comprises a metallic tube member 64 and a metallic end closure member 66, which members jointly define an enclosure in which a quantity of mercury 68 is contained. A terminal electrode 62 is supported in, and extends through, an insulator 70. The tube is held in a spring clamp 72, which clamp is mounted in an insulated manner upon an insulating base block 74 affixed to the housing member 18. A switch terminal 76, conductively affixed to the exterior of tube 64, is connected through a conductor 78 with a conductive post 80, which post is like the post 46 and is similarly mounted. The post 80 is connected to ground through a conductor 82.

In the normal attitude of the aircraft in horizontal flight, or on the ground, the mercury of the switch stands out of contact with the electrode 62, so that the switch is open. The instrument is so mounted that the electrode 62 and the axis of the tube 64 extend fore and aft. As the aircraft is nosed up in flight it soon reaches a critical angle at which the circuit is completed through contact of the mercury with the electrode 62. When that occurs the aircraft is gaining altitude and the external pressure is falling. The air in the casing 12 which was initially at ground atmospheric pressure, therefore flows through the desiccant column to the atmosphere, picking up enroute, and carrying away, the moisture driven off from the desiccant by the heater.

As soon as the upward inclination of the mercury switch is reduced below the critical angle through a change in the flying attitude of the aircraft, the heater circuit is broken and the driving off of moisture from the desiccant is discontinued.

The form of the invention illustratively disclosed in Fig. 2 is like that of Fig. 1 in many respects, but differs principally in the fact that the mercury switch is housed in the inner end of the desiccant containing sleeve, and that the valve means are provided for automatically controlling the admission and discharge of air. A particular feature of novelty is found in the heater controlled discharge valve.

In Fig. 2 an airborne instrument 10a with its casing 12a is essentially the same as before, only the humidity control mechanism 14a being significantly varied. The humidity control mechanism 14a comprises complementary housing members 16a and 18a which differ structurally from the housing members 16 and 18 of Fig. 1.

The members 16a and 18a are shown mounted in a recess which is formed in the outer wall 22a of the casing 12a, being secured to one another and to the casing 12a by any suitable means.

The housing members 16a and 18a jointly define a chamber 20a. A diaphragm 102 is marginally clamped between the members 16a and 18a and extends completely across the chamber 20a. The diaphragm carries at its center a ported valve member 104 whose port or passage 106 is normally closed by a stationary valve closure member 108. The valve closure member 108 is in the form of an adjustable screw having a conical tip, the member being threaded through the center of the wall of the housing member 16a. The diaphragm divides the space within the diaphragm chamber 20a into two distinct compartments, one freely in communication with the atmosphere through passages 110, and the other in communication with the interior of the casing 12a through a passage 112. The diaphragm is thus exposed on one side to atmospheric pressure and on the other side to the pressure within the casing.

The housing member 18a is provided with a transverse bore 114 in which a plunger valve 116 having a tapered tip is slidingly mounted. The tip of the plunger 116 normally fits into and closes the mouth of a discharge passage 118 which is formed in one side of the housing member 18a in line with the bore 114, but is adapted to be retracted in a manner, and by means, which will be presently described. The end of the bore 114 remote from the passage is closed by a threaded plug 120a. The plunger 116 has a sliding fit at its rear end with the bore but is of reduced diameter throughout the remainder of its body so that air may pass freely around the body to the passage 118.

The inner wall of the housing member 18a is desirably made imperforate, save that a central opening is provided in which the outer end of a hollow tube 120 is mounted. A plug 122 is secured in the inner end of this tube and has mounted in it a bimetallic strip 124 which is normally curved but which tends to straighten as the temperature rises. The outer end of the strip 124 is notched to receive a reduced waist portion of the plunger valve 116. Expressed otherwise, the strip, at its outer end, forms a fork whose arms are received in a circumferential groove 126 of the plunger valve 116.

The strip 124 forms a temperature responsive actuating and controlling means for the plunger valve 116, serving under the influence of a heater 40a to draw the plunger 116 to valve opening position as the temperature of the strip is raised by the heater and to return the plunger to valve closing position when the heater has been shut off. Tube 120, besides supporting and containing the bimetallic strip 124, serves as a channel of communication between the bore 114 and the interior of a desicccant containing sleeve 28a.

In this instance, as before, the heater comprises a spiral glass tube 44a but the open ends of the tube are mounted in, and extend through, a partition plate 132 which stands across the sleeve 28a near its inner end. The desiccant material 33a is confined within the sleeve 28a, between the plate 132 and the housing member 18a. Perforations 134 are provided in the sleeve 28a near the partition plate 132 and to the left of it, and this area of the sleeve is lined with filter material 136.

The plate 132 divides off a chamber 138 at the inner or right hand end of the sleeve 28a in which a mercury switch 60a is housed. The switch 60a is of the same construction as the switch 60 and is carried in a spring clamp 72a.

The heater circuit of Fig. 2 is varied slightly as compared with that of Fig. 1, but not in any material respect. Resistance wire 42a is connected at one end to a conductive post 46a. The post 46a is connected through a conductor 54a to one terminal of a battery 52a (or other suitable source of electrical energy), and the opposite terminal of the battery is connected to ground through a conductor 56a. The second end of the wire 42a is connected to a terminal 76a of the switch 60a. The opposite switch terminal 62a is connected through a conductor 78a, to a post 80a, similar to the post 46a and similarly mounted in the end of the sleeve 28a. The post 80a is connected through a conductor 82a to ground.

As before, the switch tube 64a and the terminal electrode 62a of the switch 60a extend in a fore and aft direction so that the circuit is automatically closed when the aircraft has been nosed upward to a predetermined degree. The operation of the heater is the same as before. The intake and discharge valves prevent the instrument casing from breathing when the aircraft is on the ground, both being normally maintained in closed condition. The pressure responsive intake valve is adapted automatically to open when there is an excess of external pressure, and to re-close when the external and internal pressures have been substantially equalized.

The discharge valve begins to open almost as soon as the heater comes on, and before any substantial amount of moisture has been released from the desiccant by the heater. The discharge valve soon returns to closed position after the heater has been de-energized. It is not essential that the discharge valve close quickly after the heater has been shut off, however, for even if the aircraft changes abruptly from climbing to gliding or diving, the admission of some air through the discharge valve for a time does not harm. As soon as the heater is turned off, the desiccant starts to cool and to become more absorbent because of the cooling. It is therefore in condition immediately to dry any incoming air.

The form of the illustrated invention in Figs. 4 to 7 bears resemblances to each of the forms already described, but also differs from each of them. As before, the humidity control mechanism includes a sleeve 28b which contains a quantity of desiccant material 33b through which air enroute to or from the interior of the instrument casing must pass. The sleeve 28b is like the sleeve 28 of Fig. 1 and contains a heater 40b like the heater 40 of Fig. 1. It also includes however a sleeve 120b and a bimetallic strip 124b like the sleeve 120 and the strip 124 of Fig. 2. The organization and assembly of the strip and tube are the same and the purpose of the bimetallic strip is the same. The strip 124b embraces a reduced portion of a plunger 116b which forms part of a discharge valve and which, like the plunger 116 of Fig. 2, serves to close and open a discharge passage 118b formed in a housing member 18b. The plunger is movable by the bimetallic strip in a bore 114b as the heater is turned on and off. The housing 14b further includes a ring 15b and a front housing member 16b. A diaphragm 140 is marginally clamped between the casing members 18b and 15b, and extends completely across the interior of the housing, dividing the chamber into outer and inner compartments which are maintained respectively at atmospheric pressure and at the pressure within the casing. The diaphragm carries at its center a valve member 104b through which a central air admission bore 106b is provided.

A spring arm 142, having its outer, supporting end secured between the casing members 15b and 16b, carries at its inner end a tapered valve closing member 144. The arm 142 serves also as the operating means for a heater energizing switch 146 which may advantageously be a snap switch of the toggle type as disclosed, for example, in United States Patent No. 2,521,015, the arrangement being such that the heater is energized in response to an excess of internal pressure and de-energized when the internal and external pressures have been substantially equalized.

One end of the resistance wire 42b is connected through an insulated wire 148 with a terminal 150 of the switch 146. A second switch terminal 152 is connected through a conductor 154 with a conductive post 46b which is mounted in the outer wall of the casing member 16b. The post is connected through a conductor 54b to one terminal of a battery 52b (or other suitable source of electrical energy), and the opposite terminal of the battery is connected through a conductor 56b to ground. The second end of the heater wire 42b is connected through an insulated wire 156 with a conductive post 80b. The post 80b is connected to ground through a conductor 82b. The connections described place the normally open switch in series with the heater. The wires 148 and 156 are passed together through a passage 158 which is provided through the casing members 18b, 15b and 16b and through the clamped and sealed marginal portion of the diaghragm 140.

It will be apparent that the heater switch, instead of being responsive to the flying attitude of the aircraft, in this instance is made responsive to an excess of internal pressure over the pressure of the atmosphere in the immediate vicinity of the aircraft. For this purpose the diaphragm 140b which carries and controls the movable ported member 104b of the intake valve is made also to control the heater switch.

The action is well illustrated in diagrammatic Figures 5, 6 and 7. In Fig. 5 the internal and external pressures are substantially in balance. The diaphragm 102b holds the ported valve member 104b in normal or unstressed position, and the spring arm 142 holds the movable valve closure member 144 in a normal and slightly stressed condition, the valve being closed and the switch 146 being open.

Fig. 6 illustrates the condition when there is a substantial excess of the internal pressure. The diaphragm 102b is bulged outward. The valve member 104b carried by the diaphragm is displaced leftward, and in turn displaces the valve member 144 leftward against the resistance of the spring arm 142. This causes the intake valve to be pressed more firmly closed. It also causes the spring arm 142 to engage and operate a switch actuating plunger 160 for closing the switch and maintaining it closed. Closing the switch energizes the heater and causes the discharge valve to open.

In Fig. 7 the opposite condition of unbalance exists, there being an excess of external pressure. The diaphragm 102b has now been deformed and displaced to the right of the normal position illustrated in Fig. 5. The spring arm 142 has followed the diaphragm toward the right as far as its own normal or unstressed condition and has come to rest and left the spring arm 142 with its valve member 144 behind, so that the intake valve stands open. The spring arm 142 is out of contact with the switch actuating plunger 160, so that the switch has been automatically restored to its open condition.

I have described what I believe to be the best embodiments of my invention. I do not wish, however, to be confined to the embodiments shown, but what I desire to cover by Letters Patent is set forth in the appended claims.

I claim:

1. Apparatus for controlling the humidity within the casing of an airborne instrument, comprising the combination with the instrument casing of a desiccant column, means providing for air to enter and leave the casing only through the desiccant column, and means for heating the desiccant column to reactivate the desiccant material only as air is being expelled through the desiccant material, comprising an electric heater disposed in heat exchange relation with the desiccant column, and means for energizing the heater in response to the flying attitude of the aircraft and only when the aircraft is nosed up by at least a predetermined amount sufficient to assure the expulsion of air through the desiccant.

2. Apparatus as set forth in claim 1 in which the heater switch is a mercury switch arranged to close a heater energizing circuit when tilted upward through a prescribed angle from its normal position on the ground.

3. Apparatus as set forth in claim 1 in which provision is made of means for unrestrainedly admitting and discharging air to and from the dessicant column.

4. Apparatus adapted for controlling humidity of air in the instrument casing of an aircraft which apparatus comprises an elongated sleeve extending into the casing, desiccant material within the sleeve, air passage means whereby air enters directly into and is directly withdrawn from the instrument casing through the desiccant material, said air passage means including mounting means at one end of said sleeve adapted to expose the sleeve to the atmosphere, passages in said other end of said sleeve whereby said sleeve communicates with the interior of said casing, means for heating said desiccant material in said sleeve, said heating means including a tubular heater embedded in said desiccant material and means for energizing the heater only when air is being withdrawn from the instrument casing to the atmosphere through the air passage means and desiccant material, said means for energizing the tubular heater including switch means responsive to changes of the position of the aircraft relative to the earth.

5. Apparatus as set forth in claim 4 in which intake and discharge valves are provided together with a pressure responsive control diaphragm associated with the intake valve to open such valve in response to an excess of external pressure, and a heat responsive control means associated with the discharge valve and disposed to be heated from the same source as, and concurrently with, the dessicant column, thereby to open the discharge valve in response to energization of the heater.

6. Apparatus adapted for controlling humidity of air in the instrument casing of an aircraft which apparatus comprises an elongated sleeve extending into the casing, desiccant material within the sleeve, air passage means whereby air enters directly into and is directly withdrawn from the instrument casing through the desiccant material, said air passage means including mounting means at one end of said sleeve adapted to expose the sleeve to the atmosphere, passages in said other end of said sleeve whereby said sleeve communicates with the interior of said casing, means for heating said desiccant material in said sleeve, said heating means including a tubular electrical heater embedded in said desiccant material and means for energizing the heater only when air is being withdrawn from the instrument casing to the atmosphere through the air passage means and desiccant material, said means for energizing the tubular heater including switch means, intake and discharge valves for controlling the admission and discharge of air, a pressure responsive control diaphragm associated with the intake valve and constructed and arranged to open the valve in response to an excess of external pressure, and a heat responsive control means for the discharge valve, disposed in position to be heated by the dessicant column heater, said switch means including means for energizing the heater only under conditions favoring an excess of internal pressure in the casing.

7. Apparatus as set forth in claim 6 in which the intake valve comprises a movable ported member and a movable closure member, the pressure responsive control device associated with the intake valve comprising a diaphragm exposed on its opposite faces to the pressure within the casing and to atmospheric pressure, respectively, and in which a spring arm is provided for carrying the movable closure member, the spring arm and diaphragm being effective to maintain the intake valve normally closed, but the spring arm being ineffectual to cause the closure member to follow the ported member beyond a definite limiting position as the diaphragm is displaced inward by an excess of external pressure, the spring arm being capable, however, of being displaced outward as the diaphragm bulges outward beyond normal position in response to an excess of internal pressure, and serving when so displaced as the means for causing the heater to be energized.

8. Apparatus adapted for controlling humidity of air in the instrument casing of an aircraft which apparatus comprises an elongated sleeve extending into the casing, desiccant material within the sleeve, air passage means whereby air enters directly into and is directly withdrawn from the instrument casing through the desiccant material, said air passage means including mounting means at one end of said sleeve adapted to expose the sleeve to the atmosphere, said mounting means including at least one filter, passages in said other end of said sleeve whereby said sleeve communicates with the interior of said casing, at least one filter in close proximity to said sleeve passages, means for heating said desiccant material in said sleeve, said heating means including a tubular heater imbedded in said desiccant material and means for energizing the heater only when air is being withdrawn from the instrument casing to the atmosphere through the air passage means and desiccant material, said means for energizing the tubular heater including switch means responsive to the position of the aircraft relative to the earth.

References Cited in the file of this patent

UNITED STATES PATENTS

| | | |
|---|---|---|
| 2,322,603 | Thumim et al. | June 22, 1943 |
| 2,462,952 | Dunkak | Mar. 1, 1949 |
| 2,526,782 | Thorpe | Oct. 24, 1950 |
| 2,596,979 | Case | May 20, 1952 |